PROCESS FOR THE PRODUCTION OF AMMONIUM POLYPHOSPHATE

Filed Feb. 13, 1970 6 Sheets-Sheet 1

AMMONIATION PROCESS WITH IN-LINE REACTOR FOR PRODUCTION OF SOLID AMMONIUM POLYPHOSPHATE

Robert S. Meline
Robert G. Lee INVENTORS.

BY Robert A. Petrusek
Agent

DETAIL OF FOAM DISENGAGER VESSEL WITH IN-LINE REACTOR

Robert S. Meline
Robert G. Lee INVENTORS.

BY Robert A. Petrusek
Agent

AMMONIATION PROCESS WITH IN-LINE REACTOR FOR PRODUCTION OF FLUID PRODUCTS DIRECTLY FROM THE AMMONIUM POLYPHOSPHATE MELT

Robert S. Meline
Robert G. Lee
INVENTORS.

BY Robert A. Petrusek
Agent

PROCESS FOR THE PRODUCTION OF AMMONIUM POLYPHOSPHATE

Filed Feb. 13, 1970

IN-LINE REACTOR DISCHARGING INTO FOAM BREAKER RETAINING FUNNEL

Robert S. Meline
Robert G. Lee INVENTORS.

BY Robert A. Petrusek
Agent

TUBE AND ROTOR VAPOR DISENGAGER FOR PRODUCTION OF AMMONIUM POLYPHOSPHATE

Robert S. Meline
Robert G. Lee
INVENTORS

BY Robert A. Petrusek
Agent

PROCESS FOR THE PRODUCTION OF AMMONIUM POLYPHOSPHATE

Filed Feb. 13, 1970 6 Sheets-Sheet 6

DIRECT PRODUCTION OF AMMONIUM POLYPHOSPHATE

Robert S. Meline
Robert G. Lee INVENTORS.

BY Robert A. Petrusek
Agt

United States Patent Office 3,733,191

Patented May 15, 1973

3,733,191

PROCESS FOR THE PRODUCTION OF AMMONIUM POLYPHOSPHATE

Robert S. Meline and Robert G. Lee, Florence, Ala., assignors to Tennessee Valley Authority Continuation-in-part of application Ser. No. 833,936, June 17, 1969, which is a continuation-in-part of application Ser. No. 715,786, Mar. 25, 1968, both now abandoned. This application Feb. 13, 1970, Ser. No. 11,060

Int. Cl. C05b *7/00*

U.S. Cl. 71—34 5 Claims

ABSTRACT OF THE DISCLOSURE

Process for the production of high-analysis solid and liquid (solutions and suspensions) ammonium polyphosphate fertilizers of high $P_2O_5$ polyphosphate and availability levels from wet-process phosphoric acid and ammonia. The acid is ammoniated so that fixation of ammonia, dehydration of the acid, and formation of polyphosphate occur simultaneously. The polyphosphate content is maintained at a high level by dispersal of the polyphosphate foam in a disengaging vessel of design to allow escape of free water entrapped in the foam prior to reduction in temperature and thereby preventing hydrolysis of the phosphate with the entrapped water.

The invention herein described may be manufactured and used by or for the Government for governmental purposes without the payment to us of any royalty therefor.

This application is a continuation-in-part of our copending application Ser. No. 833,936, filed June 17, 1969 (now abandoned), which in turn is a continuation-in-part of our application Ser. No. 715,786, filed Mar. 25, 1968 (now abandoned), both applications filed for Process for the Production of Ammonium Polyphosphate.

Our invention relates to an improvement in fluid solutions as well as suspensions and solid fertilizers and an improved process of production; more particularly to a process for the manufacture of highly concentrated fluid and solid mixed fertilizers produced directly from the ammoniation of phosphoric acid of the wet-process type; and more particularly to the production of such highly concentrated fluid and solid mixed fertilizers by the ammoniation of wet-process phosphoric acid wherein the previously required separate step of concentrating said wet-process phosphoric acid up to the "super" acid range is entirely eliminated; and still more particularly to the ammoniation of wet-process phosphoric acid under conditions in which ammoniation, dehydration, and polyphosphate formation occur simultaneously, said process resulting in the production of ammonium polyphosphate and characterized by the fact that the product therefrom is substantially free from unavailable $P_2O_5$ and allows the use of acid with moderate to high contents of impurities wherein the necessary conditions are obtained by continuous ammoniation, dehydration, and condensation of acid in a single operation.

Fluid mixed fertilizers having compositions similar to those of standard dry mixed fertilizers are well known in the industry and are increasing in popularity. Such solutions and suspensions have the advantages over dry mixed fertilizers in that costs of evaporating water and bagging are eliminated and application to the soil is greatly simplified. Moreover, the use of fluid fertilizers eliminates difficulty due to segregation and caking often encountered in the storing of dry fertilizers.

Fluid fertilizers, however, in the past, have had some outstanding disadvantages.Raw-material costs have been relatively high and particularly in the production of solutions they have oftentimes been so corrosive as to result in high maintenance and storage costs. The solutions also, in the past, have been limited to a maximum plant food content of about 33 percent by weight because experience has taught that concentration in excess of this amount usually has resulted in precipitation of salts. These disadvantages, in many instances, outweighed the benefits derived by elimination of the evaporation and bagging steps.

One of several recent breakthroughs in overcoming these disadvantages in fluid mixed fertilizers is taught and described in U.S. Patent 2,950,961, Striplin et al., assigned to the assignee of the present application. Striplin has discovered that he is able to prepare a solution mixed fertilizer containing substantial values of both N and $P_2O_5$ in a process wherein he rapidly and intimately introduces ammonia and superphosphoric acid into a reaction vessel under controlled conditions. As is taught by Striplin, the superphosphoric acid utilized in his process, which may be derived from dissolving excess $P_2O_5$ in orthophosphoric acid or by evaporating water from orthophosphoric acid, is ammoniated in such a way that the resulting ammonium polyphosphate salts which comprise his fluid fertilizers are proportioned in his product in substantially the same dependent and proportional relationship as are the various species of polyphosphoric acids originally present in his superphosphoric acid feed constituent. He teaches that the retention of this species of polyphosphoric acids as the ammonium salts thereof is beneficial in restraining the precipitation of salts in his product solution.

In another fairly recent breakthrough in overcoming the disadvantages of fluid mixed fertilizers produced by the prior-art methods, there is found in application Ser. No. 835,377, John G. Getsinger, assigned to the assignee of the present application, the discovery that if orthophosphoric acid specifically of the wet-process type is subjected to evaporations means, either at atmospheric or at reduced pressure, so as to condense the wet acid and raise its $P_2O_5$ content up to the range of approximately 65 to 80 percent $P_2O_5$, the gelatinous precipitates which otherwise render wet-process phosphoric acid unusable for the preparation of high-analysis fluid mixed fertilizers are substantially sequestered. In addition, there is taught in said application that if wet-process phosphoric acid is so concentrated, it may then be subsequently ammoniated to form fluid mixed fertilizers in which the congeneric impurities originally present in said wet process phosphoric acid are sequestered and caused to remain in solution, thereby eliminating the formation of said gelatinous precipitates. As may be seen from the disclosure enumerated above, it is now known in the art how to produce fluid mixed fertilizers having plant nutrient values comparable to many standard dry mixed fertilizers and, in addition, how to prepare said fluid fertilizers by such means and in such forms so as to substantially overcome many of the disadvantages originally inherent in the production of fluid fertilizers prior to the Striplin disclosure. From a consideration of the economics involved, it is, in many cases, more highly desirable to produce such fluid mixed fertilizers by the ammoniation of concentrated wet-process superphosphoric acid rather than by the ammoniation of the cleaner, but more highly expensive, superphosphoric acid of the electric-furnace type. This consideration is dependent on, among other things, current prevailing rates of commercial electric power.

And in still another fairly recent breakthrough in overcoming some of the disadvantages of fluid and solid mixed fertilizers produced by the prior-art methods, there is found in U.S. Patents 3,171,733, 3,228,752, 3,264,085, and 3,336,127, Hignett et al., assigned to the assignee of the present invention, the discovery of new compositions of matter and methods for their production which contain up to about 80 percent of their weight in the form of available plant food and which are produced by a process of directly reacting anhydrous ammonia with superphosphoric acid at elevated temperatures and pressures. These compositions of matter may either be applied directly to the soil as a solid fertilizer or may be shipped from the point of manufacture to the intended point of usage and then may subsequently simply be dissolved in water, thereby effecting the production of high-analysis fluid mixed fertilizer suitable for application to the soil. In these teachings of Hignett et al., the feed material for the reactor is anhydrous ammonia and superphosphoric acid, either of the electric-furnace type of wet-process type and the polyphosphate is present in the superphosphoric acid prior to ammoniation. This requirement necessitates, when said superphosphoric acid is derived from the leaching of phosphate rock by sulfuric acid, i.e., wet-process acid, concentrating merchant-grade wet-process acid up to the superphosphoric range by means of a separate and fairly costly concentration step in that special equipment and materials of construction must be used to insure against the corrosive characteristics of acid so concentrated, and in the thermal requirements from the fuel to to be used therein.

And in still another and most recent breakthrough in overcoming some of the disadvantages of fluid and solid mixed fertilizers produced by the prior-art methods, there is found in U.S. Patent 3,382,059, Getsinger, assigned to the assignee of the present invention, the discovery of a process for the production of highly concentrated fluid and solid mixed ammonium polyphosphate fertilizers produced by the ammoniation of phosphoric acid of the wet-process type which overcomes certain of these disadvantages of the prior art and which will greatly influence an economic swing to the use of wet-process acid as the starting constituent rather than the more highly priced electric-furnace type acid. Getsinger has developed a reliable, simple, and efficient method for the production of fluid and solid ammonium polyphosphate fertilizers by utilizing ordinary merchant-grade wet-process phosphoric acid in the $P_2O_5$ content range from about 50 to 58 percent by weight wherein the separate step of subjecting said acid to an evaporating step to increase its $P_2O_5$ content up to the "super" range (65–80% $P_2O_5$) is eliminated, thereby greatly improving on the economics involved.

Further, Getsinger has found that, in carrying out his process for the manufacture of fluid and solid mixed fertilizers by the ammoniation of merchant-grade wet-process phosphoric acid, he can utilize the free heat of ammoniation to evaporate water and form polyphosphates rather than require the use of expensive heat from fossil fuel. His process combines the two functions of concentration and ammoniation simultaneously instead of using two separate process steps. In addition, in his process the evaporation of water is from a relatively noncorrosive acid salt solution instead of from a highly corrosive acid, thus allowing the use of less expensive materials of construction. An alternate embodiment of Getsinger's teaching is disclosed in application Ser. No. 542,779, filed Aug. 15, 1966, John M. Potts, assigned to the assignee of the present application and now abandoned.

In the copending application of Milton R. Siegel et al., Ser. No. 658,962, filed Aug. 7, 1967, now U.S. Pat. No. 3,562,778, assigned to the assignee of the present invention, there is disclosed that although the two-stage ammoniation process of Getsinger is a new and useful tool in producing ammonium polyphosphates by a method which substantially eliminates the necessity of first separately concentrating wet-process phosphoric acid from merchant-grade strength up to the superphosphoric acid range (about 65 to about 80 percent $P_2O_5$), it appears to have certain limitations, the greatest of which perhaps is the degree of availability of the total $P_2O_5$ content of the ammonium polyphosphate produced thereby. Siegel et al. state that it should be understood that $P_2O_5$ availability referred to is determined by standard procedures used in the fertilizer industry and defined in the Official Methods of Analysis of the Association of Official Agricultural Chemists, 10th Edition, 1965, published by the Association of Official Agricultural Chemists, Washington, D.C. They have alleged to have found further that highly desirable products can be produced by the two-stage ammoniation process of Getsinger only when the feed acids contain relatively low metallic impurity content or the products therefrom have low polyphosphate levels. The metallic impurity content may be expressed as the $R_2O_3:P_2O_5$ mole ratio, wherein $R_2O_3$ symbolizes the weight percent of the total of the two principal metallic impurities, iron and aluminum, reported as their oxides. For example, depending on the maximum operating temperature of the two-stage ammoniation process of Getsinger, Siegel et al. report that the percentage of the $P_2O_5$ availability falls off rapidly from substantially 100 percent when the $R_2O_3:P_2O_5$ mole ratio is greater than about 0.04. As taught in Siegel et al., in the Getsinger process most of the ammoniation and essentially all of the dehydration of the orthophosphoric acid occurs in the second stage; the first stage is used essentially to recover the ammonia evolved from second stage in order to prevent ammonia loss from the process and to preneutralize the acid. As a result, undesirable reactions occur with the metallic impurities in the acid to form compounds that contain substantial portions of the $P_2O_5$ in a form that is unavailable to growing plants. On the other hand, according to the teachings of Siegel et al., if the ammoniation is carried out in such a manner that, first, a high proportion of the ammonia is fixed while the polyphosphate content is low, and then, the final dehydration of the orthophosphate to polyphosphate is allowed to occur then the undesirable reactions that result in the formation of the unavailable $P_2O_5$ do not occur. Using this procedure, Siegel et al. claim they can obtain substantially 100 percent $P_2O_5$ availability when the $R_2O_3:P_2O_5$ mole ratio in the wet-process phosphoric acid feed is as great as about 0.1.

We discovered in our earlier pilot plant tests utilizing the in-line reactor, which is similar to but much larger than the T mixer in Siegel supra, that the fixation of ammonia prior to dehydration and formation of the polyphosphate is not the only essential mechanism of the reaction. Based on the results of our earlier tests, we concluded that fixation of ammonia, dehydration, and polyphosphate formation must occur simultaneously in our process in order to yield products with the desired characteristics. Following are two pertinent points discovered in our work leading to our new, novel, and unique process for the production of either solid ammonium polyphosphate or fluid ammonium polyphosphate fertilizer solutions and/or suspensions using equipment similar to that shown in Siegel et al., more particularly their FIG. 4, which will be further identified in our description of our drawings:

(1) The primary basis for obtaining products with essentially all of the $P_2O_5$ in an available form is found to be the use of good mixing at the point of fixation of the ammonia and formation of the polyphosphate. This may be accomplished (by mechanical means) in either a well agitated second stage vessel to which the partially ammoniated acid and ammonia are fed or in an in-line reactor. The excellent mixing provided by an in-line type reactor is well known. No explanation has been established for requirement for good mixing at the point of fixation of ammonia and formation of the polyphosphate other than the possibility that good agitation therein eliminates areas of over-ammoniation with accompanying excessive temperature. Data from our tests based on injecting ammonia and partially ammoniated phosphoric acid into the second-stage reactor vessel, with and without good agitation, are shown in Table I below in runs 52–1 and 22–1, respectively. It is to be noted that the degree of partial ammoniation or preneutralization in the scrubber should not exceed that equivalent to about 2.5 pounds of $NH_3$ per unit of $P_2O_5$ (pH of about 2.0). Higher degrees exceed the solubility of ammonium phosphate salt in the merchant-grade wet-process acid. Also shown are data for test run 96–2 in which we used the in-line reactor to accomplish simultaneously the fixation of ammonia, dehydration, and polyphosphate formation, all occurring in a single area.

TABLE I.—OPERATING RESULTS OF PILOT PLANT FOR DIRECT PRODUCTION OF AMMONIUM POLYPHOSPHATE FROM WET-PROCESS PHOSPHORIC ACID

Phase 1

| | Run No. | | |
|---|---|---|---|
| | 22–1 | 52–1 | 96–2[a] |
| Agitation: | | | |
| Number of turbines | 1 | 2 | 1 |
| Turbine diameter, inches | 4 | 8 | 8 |
| Feed acid: | | | |
| $R_2O_3$:$P_2O_5$ mole ratio | 0.07 | 0.07 | 0.06 |
| $P_2O_5$, percent | 54.5 | 54.5 | 53.5 |
| Preheat temp., ° F | 310 | 275 | 190 |
| Ammonia temp., ° F | 315 | 340 | 340 |
| 1st stage temp. ° F | 290 | 285 | 286 |
| In-line reactor temp., ° F | | | 472 |
| 2d stage temp., ° F | 450 | 450 | 450 |
| Product melt (percent by wt.): | | | |
| Total N | 9.6 | 11.5 | 12.3 |
| Total $P_2O_5$ | 62.0 | 61.6 | 57.5 |
| Percent of total $P_2O_5$ as: | | | |
| Available $P_2O_5$ | 92 | 100 | 100 |
| Polyphosphate $P_2O_5$ | 40 | 39 | 52 |
| Lb. $NH_3$/unit $P_2O_5$ | 3.8 | 4.5 | 5.2 |

[a] Pin-type foam breaker mounted on same shaft as turbine.

(2) When using the in-line reactor in our pilot plant in our earliest work, we found it necessary to use it in a vertical position in order to prevent channeling of ammonia past the fluid. The pilot plant assembly consisted of a 2-inch pipe T with a 40-inch section of 2-inch pipe between the T and the disengaging vessel. The 2-inch pipe discharged into the disengaging vessel in a way substantially different from that disclosed in Siegel et al. Again in the earliest work on our new and novel process, we found it not only desirable but critical that the pipe from the in-line reactor enter the disengaging vessel at a point about midway between the top and the bottom of the vessel. With this arrangement, we found that the material discharged from our in-line reactor does not have to pass through any molten material contained in the disengaging vessel and thereby minimize entrainment of product material through the gas outlet. The criticalness of this arrangement and our theory for its operation, together with data backing up such theory, is disclosed in greater detail below.

In studying the two-stage ammoniation process of Getsinger, supra, we found that the proportion of the $P_2O_5$ in the final product which is present in an unavailable form, i.e., in a form not available to the growing plant, increases both with an increase in the maximum operating temperature and also with an increase in the $R_2O_3$:$P_2O_5$ mole ratio of the feed acid. Thus, it may be seen that the operating variables in Getsinger's two-stage ammoniation process tend to offset one another's benefits and advantages in that it is now known that the proportios of $P_2O_5$ present in the polyphosphate form in the desired product increases both with an increase in maximum operating temperature and in the degree of ammoniation or fixation of ammonia reported as pounds of ammonia fixed per unit of $P_2O_5$. In studying the two-stage ammoniation process of Siegel et al. supra for the production of ammonium polyphosphate from ammonia and wet-process orthophosphoric acid, we have been taught the need to fix the large proportion of the ammonia prior to the final dehydration process in which the bulk of the polyphosphate is fixed to give products containing about 50 percent $P_2O_5$ in a polyphosphate form and essentially all of the $P_2O_5$ in an available form. Although this latter process lives up to its alleged improvements over that of Getsinger, supra, i.e., an ultimate ammonium polyphosphate product having at least 99 percent of its $P_2O_5$ in a form readily available for growing plants, it does require that from about 3 to 5 pounds of ammonia per unit of $P_2O_5$ be fixed prior to the formation of as much as 20 percent of the total $P_2O_5$ as ammonium polyphosphates rather than as the uncondensed ammonium orthophosphate. Although this process of Siegel et al. can be carried out to accomplish the alleged desired results, it oftentimes has evidenced some problems with foam formation in the second-stage reactor vessel. Under conditions where there has been a problem of foam formation in the second-stage reactor vessel, the products therefrom have been somewhat limited in the proportion of polyphosphate content in the melt product.

We have now found that the fixation of ammonia prior to dehydration and formation of polyphosphate is not the essential mechanism of the reaction to obtain the desired results, as shown by Siegel et al., albeit an important factor. We have found that the fixation of the ammonia, the dehydration of the resuting ammoniated product, and the polyphosphate formation therein must occur simultaneously in order to yield products which are consistently of the characteristics desired.

We have further found that it is necessary to disperse any foam which might form in such a second-stage reactor and separate the water contained in the foam from the polyphosphate melt before cooling occurs therein to avoid the hydrolysis reaction between the trapped water vapor and the foam, which will result in the decreased polyphosphate content in the melt.

Thus, it can be readily seen that we have discovered a new, novel, unique, and improved process for the production of ammonium polyphosphate by the ammoniation of wet-process phosphoric acid which completely eliminates the separate step of concentrating said acid from merchant-grade strength up to the superphosphoric acid range and which new and improved process also results in the production of ammonium polyphosphate containing, in addition to substantially 100 percent of the $P_2O_5$ values in an available form suitable for use by the growing plant, a product containing greater proportions of the $P_2O_5$ values therein in the form of ammonium polyphosphate comprising ammonium pyrophosphate, ammonium tripolyphosphates, and higher acyclic ammonium polyphosphates, such as ammonium tetrapolyphosphates, ammonium heptapolyphosphates, etc. It should also be evident that, although the teachings of Siegel et al. improve on the teachings of Getsinger in that the product from Siegel's process has at least about 99 percent of its total $P_2O_5$ content in an available form and does contain oftentimes greater proportions of the total $P_2O_5$ content in the form of ammonium polyphosphates rather than as ammonium orthophosphate, we have still further improved upon Siegel's improvement in that not only does our product consistently contain essentially 100 percent of its total $P_2O_5$ in a form readily available to the growing plant, but it also contains (because of our elimination of the hydrolysis reaction between trapped water vapor and the polyphosphate foam) substantially higher proportions of the total $P_2O_5$ content as ammonium polyphosphates as does Siegel et al.

It is therefore an object of the present invention to produce improved stable fluid fertilizers of either the clear solution or suspension type and solid mixed fertilizers containing upwards of about 50 percent total $(N+P_2O_5)$ in the fluids and about 70 percent total $(N+P_2O_5)$ in the solids by a process employing the steps of: (1) ammoniating wet-process phosphoric acid wherein fixation of the ammonia by the wet-process phosphoric acid, the dehydration of the so ammoniated acid, and the formation of ammonium polyphosphates occurs simultaneously; (2) dispersing foam and separating water vapor therefrom before cooling occurs to avoid hydrolysis reaction between trapped water vapor in the foam, thereby insuring a product of unusually high ammonium polyphosphate content, and which, process, in yielding solution fertilizers therefrom, is characterized by the fact that said solution fertilizers form substantially no precipitates upon standing and storage.

Another object of the present invention is to produce improved stable fluid and solid mixed fertilizers containing upwards of about 50 percent total $(N+P_2O_5)$ in the fluids and about 70 percent in the solids by a process employing the ammoniation of wet-process phosphoric acid and which wet-process phosphoric acid incorporated in our method contains a maximum of approximately 58 percent $P_2O_5$ prior to incorporation therein, thereby eliminating a separate concentrating step of raising the $P_2O_5$ content of said starting acid up to the "super" acid range.

Still another object of the present invention is to provide improved stable fluid and solid mixed fertilizers containing upwards of about 50 percent $(N+P_2O_5)$ in the fluids and about 70 percent in the solids by a process employing the ammoniation of wet-process phosphoric acid, which fluid fertilizers when produced as solutions form substantially no precipitates upon standing and storage, which wet-process phosphoric acid incorporated in our method contains a maximum of approximately 58 percent $P_2O_5$ prior to incorporation therein, thereby eliminating a separate concentrating step of raising the $P_2O_5$ content of said starting acid up to the superphosphoric range, and which process allows the use of wet-process phosphoric acid containing relatively high $R_2O_3$:$P_2O_5$ mole ratios, i.e., up to about 0.10, while on the other hand insuring a highly desirable ammonium polyphosphate product containing substantially increased proportions of fixed ammonia, substantially increased proportions of ammonium polyphosphates comprising ammonium pyrophosphate, ammonium tripolyphosphate, and higher acyclic ammonium polyphosphates, and containing substantially 100 percent of its $P_2O_5$ values in a form available to the growing plant.

We have discovered that the foregoing and other objects of the present invention can be attained by a process for the manufacture of improved stable fluid and solid mixed fertilizers from ordinary merchant-grade wet-process phosphoric acid and anhydrous ammonia wherein the fixation of ammonia with the merchant-grade wet-process phosphoric acid, the dehydration of the resulting neutralized wet-process phosphoric acid, and the polyphosphate formation resulting from the condensation of said ammoniated wet-process phosphoric acid occur simultaneously in but a single operation to yield products having substantially 100 percent of their $P_2O_5$ content in an available form and containing consistently unusually high proportions of the $P_2O_5$ content therein as ammonium polyphosphates comprising ammonium pyrophosphate, ammonium tripolyphosphate, and higher acrylic ammonium polyphosphates.

In our process, we have also discovered that a critical factor in obtaining the desired results is to provide for the disengagement of water vapor entrapped in the heavy viscous foam which is found to accompany and result from the combination of concentration, ammoniation, and dehydration of the so-combined merchant-grade wet-process phosphoric acid and anhydrous ammonia. Thus, the novelty of our process resides in both the simultaneous fixation of ammonia, dehydration, and condensation for polyphosphate formation and the disengagement of water vapor entrapped in the accompanying heavy viscous foam to thereby ensure a product wherein substantially 100 percent of the $P_2O_5$ values are in a form readily available to the growing plants and whereby consistenely higher proportions of ammonium polyphosphates in proportion to the ammonium orthophosphate in the product can be produced than have previously been obtainable, even in the teachings of Siegel et al., while still using merchant-grade wet-process phosphoric feed acid containing relatively high amounts of $R_2O_3$ impurities being processed at relatively high operating temperatures.

Our invention, together with further objects and advantages thereof will be better understood from a consideration of the following description taken in connection with the accompanying drawings in which:

FIG. 1 is a flowsheet generally illustrating the principles of our novel process in one embodiment thereof utilizing ammoniation in a first reactor vessel and in an in-line reactor, and recycling of offgases from a disengaging vessel to the first-stage ammoniation reactor vessel.

FIG. 2 is a detailed illustration of our first version of foam disengager vessel 9 showing the relationship of the discharge from the in-line reactor to the vetrical midpoint of this first model of our foam disengager and the relationship of the load level of ammonium polyphosphate melt resulting from the disengagement of water vapor entrapped in the heavy viscous foam discharged from line 7' into about the midpoint of foam disengager 9 from in-line reactor 7.

Figure 2:
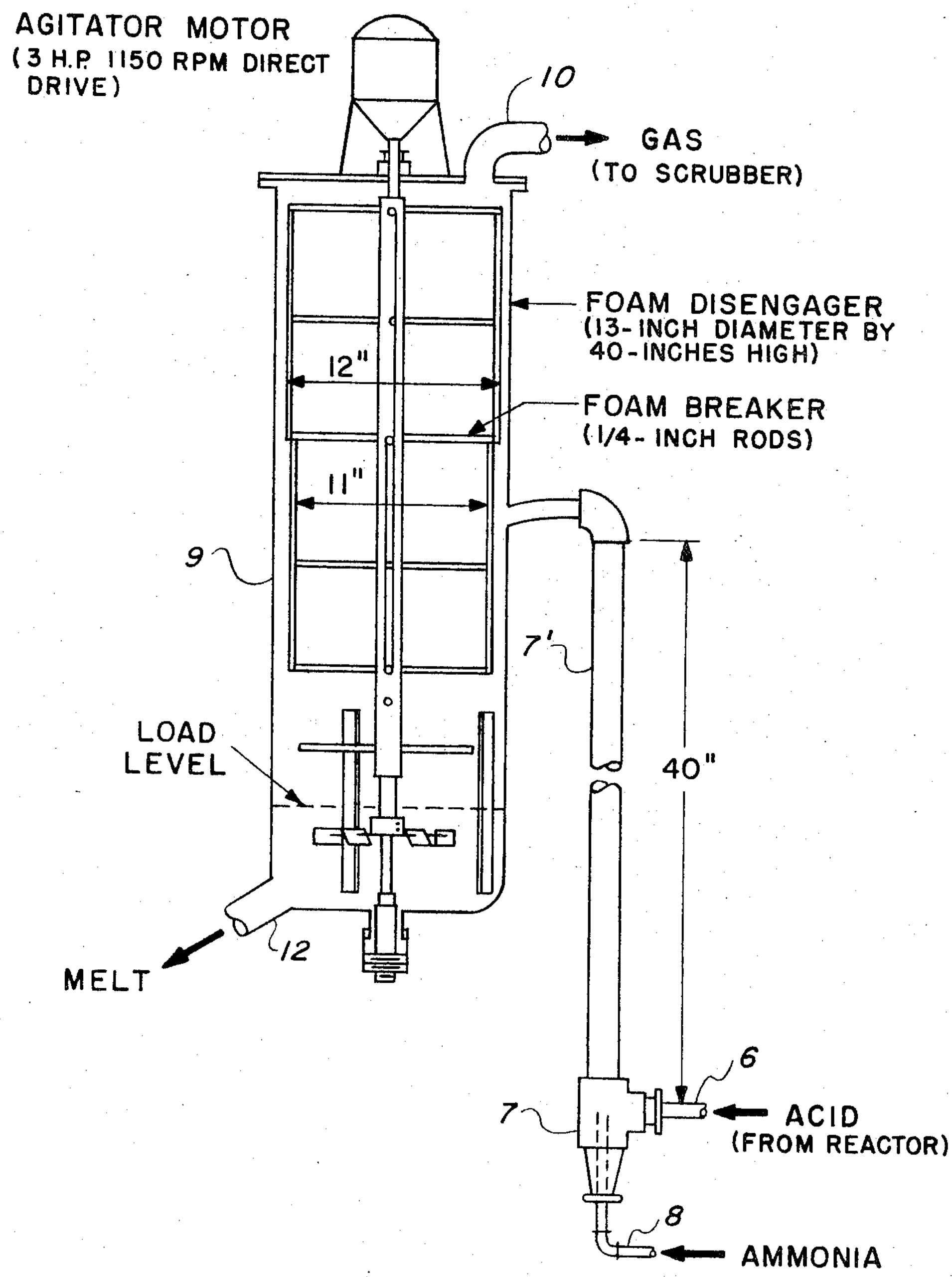
Figure 5:
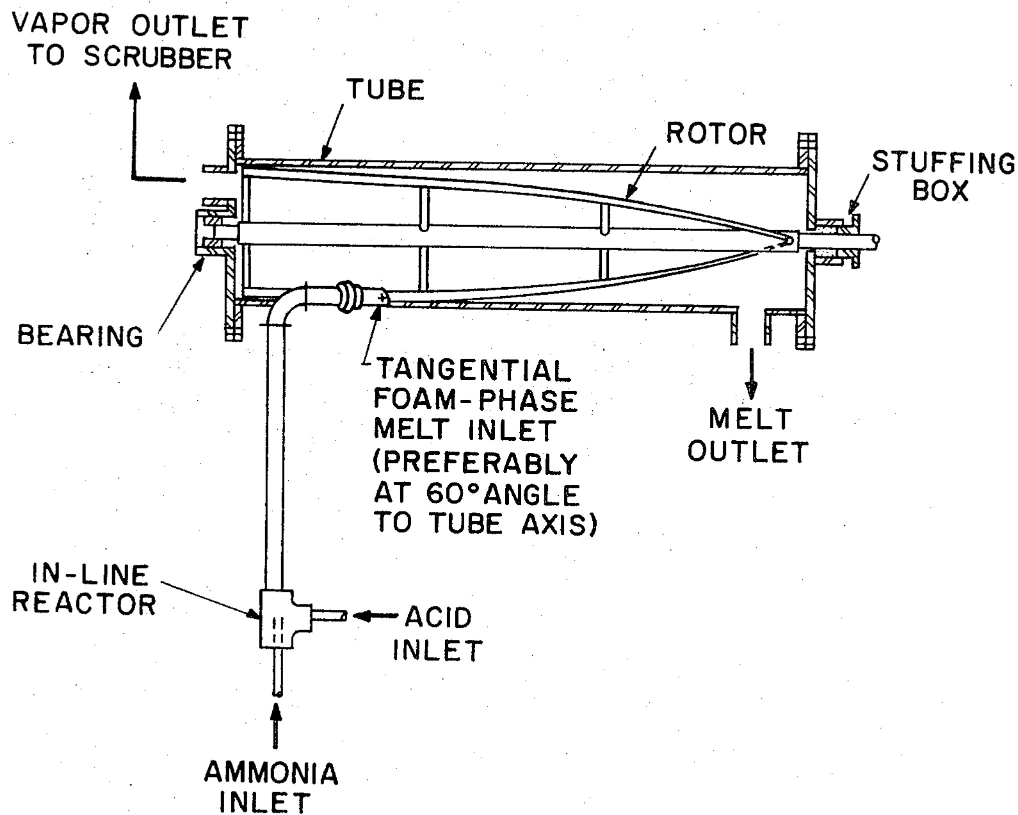

FIG. 5 is a detailed illustration of our second version of our new foam disengager showing the relationship of discharge from the in-line reactor to our new tube and rotor-vapor disengager which function and purpose are the same as the disengager vessel described in our earlier work and shown in FIG. 2 to increase the conversion of orthophosphate to polyphosphate by retaining, shearing, and dispersing the foam-phase melt to allow more water vapor to escape. This new unit, however, allows consistent operation with little or no difficulty and greatly improved prospects for use of this process on a commercial scale.

Figure 6:
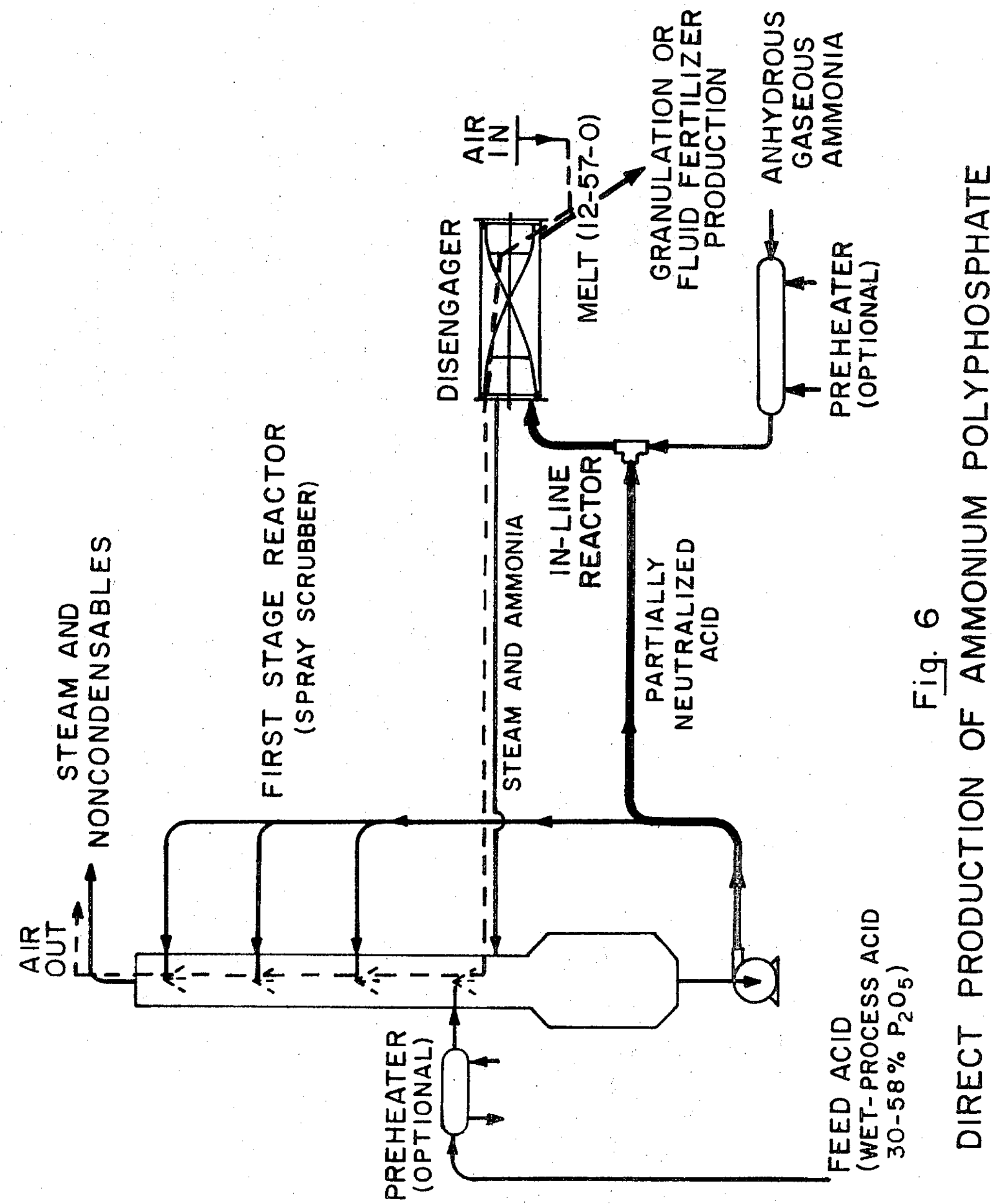

FIG. 6 is a detailed illustration of our third version of our new foam disengaging process showing the relationship of discharge from the in-line reactor to our new tube and rotor disengager, which function and purpose are the same as our second version shown in FIG. 5 to increase the conversion of orthophosphate to polyphosphate by retaining, shearing, and dispersing the foam-phase melt to allow more water vapor to escape. In this third version of our process, the entire system is under a slight negative pressure. This slight negative pressure results in air being pulled into and through the melt discharge orifice through the disengaging apparatus as well as most of the rest of the system. The movement of air into the melt discharge outlet and through the foam disengaging vessel was found quite unexpectedly to result in substantially decreasing or eliminating the slight amount of entrapped air remaining in the melt having passed through the disengaging vessel with the net result of a melt product having a specific gravity about five times that obtained without the use of negative pressure and a greatly increased fluidity whereby the overall operation of the process is still further improved over our second version, i.e., without the use of negative pressure.

With reference to the in-line reactor, many of those presently known in the art can be utilized such as, for example, as shown in Chemical Engineering, June 8, 1964, pages 165–220, in Chemical Engineers Handbook, McGraw-Hill Book Co., Inc. (1950). In the teachings of Siegel et al., supra, it is noted that the in-line reactor must be capable of intimately mixing ammonia and partially neutralized acid and at the same time fixing relatively large proportions of ammonia without the formation of large amounts of polyphosphate. On the other hand, in our new, novel, and unique process, our requirements for the in-line reactor are somewhat reversed from that shown in Siegel et al. in that, as will be seen more clearly, it is in the in-line reactor wherein we simultaneously fix substantially all of our ammonia, we dehydrate the resulting product therefrom, and we condense the resulting material such that in fact relatively large proportions of ammonia are fixed with the simultaneous formation of large amounts of polyphosphate. Because of the high degree of agitation and short retention time in our foam disengager, the $P_2O_5$ availability is not dependent on the amount of polyphosphate formed in the in-line reactor.

Figure 1:
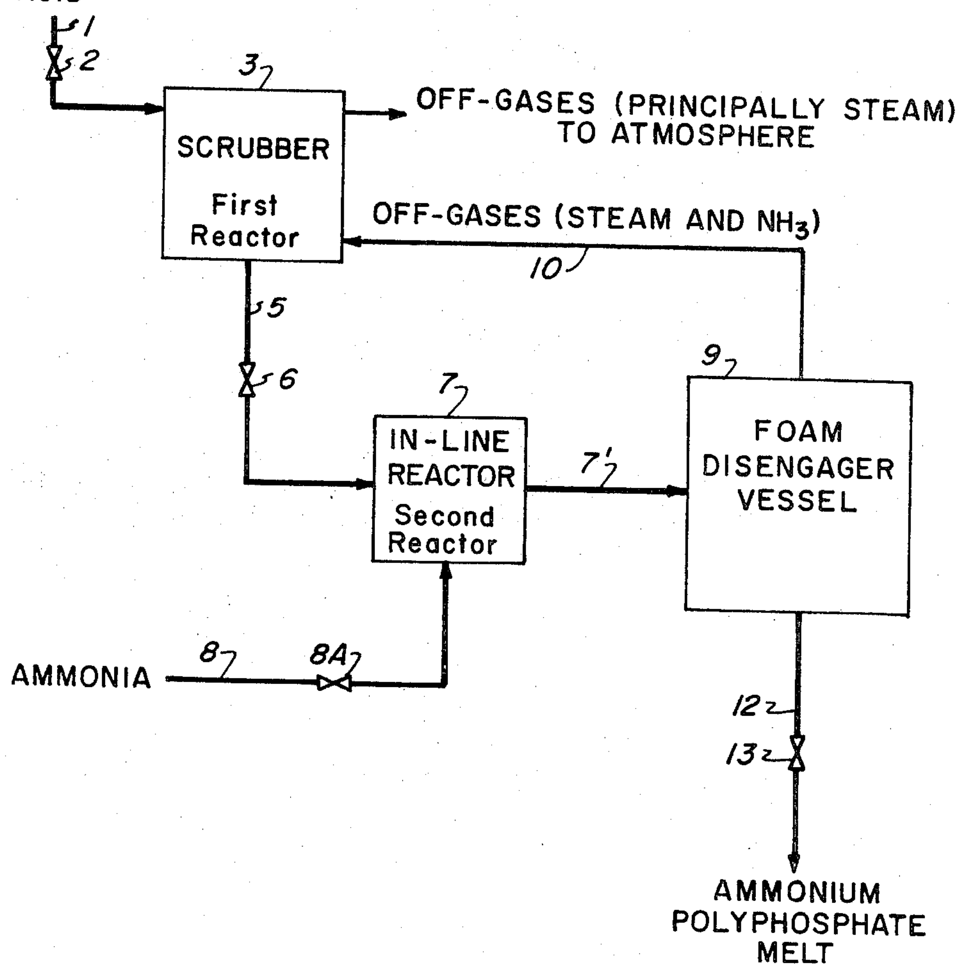

Referring now more particularly to FIG. 1, we have depicted one embodiment of our new and novel process which utilizes the countercurrent ammoniation of merchant-grade wet-process phosphoric acid in the in-line reactor with the first stage prior thereto acting as a scrubber for the offgases consisting primarily of steam and ammonia from the foam disengager vessel and as a preneutralizer wherein part of the free water in the wet-process phosphoric acid entering said first stage is evaporated by the heat from the reaction of the ammonia. The function of the process stage subsequent to the in-line reactor is to serve as a vessel for disengagement of the water vapor entrapped in the heavy viscous foam discharged from the in-line reactor.

Thus, merchant-grade wet-process phosphoric acid from a source not shown is fed via line 1 and means for control of flow 2 into scrubbing vessel 3. Scrubber vessel 3 recovers any unreacted ammonia from disengagement vessel 9 via line 10 by the partial neutralization of the merchant-grade wet-process phosphoric acid therein and passes the steam from line 10 and from the evaporation of part of the water in the acid in scrubber vessel 3 to the atmosphere as offgases. The pH maintained in scrubber vessel 3 is in the range from about 1.0 to about 2.0 when diluted with water in a 9:1 ratio. Simultaneously, a stream of only partially neutralized merchant-grade wet-process phosphoric acid is removed from scrubber vessel 3 via line 5 and means for control of flow 6, and is introduced into our in-line reactor 7. Simultaneously, anhydrous ammonia from a source not shown is introduced into in-line reactor 7 via line 8 and means for control of flow 8*a*. Substantially all of the ammonia present in the product of our process is fixed in in-line reactor 7, the only portion not so fixed being that recovered from the offgases via line 10 to scrubber vessel 3. That is to say that there is no further reaction between free ammonia and the melt resulting after it leaves in-line reactor 7 via line 7' to foam disengager vessel 9. Thus, the fully ammoniated and fixed material flows from in-line reactor 7 to disengager vessel 9 via line 7' where no further fixation of ammonia occurs and wherein trapped water vapor in the foam accompanying the melt from line 7' to disengager vessel 9 is disengaged therefrom before cooling thereof occurs to avoid the hydrolysis reaction between such trapped water vapor and such foam to thereby ensure that there is no decreased polyphosphate content in the resulting melt drawn from foam disengager vessel 9 via line 12 and means for control of flow 13 to the appropriate facilities (not shown) wherein the melt is processed into either a solid or liquid fertilizer as cited. Alternatively, before the melt is allowed to solidify, a number of additives may be added thereto such as the micronutrient or trace elements, potassium sources as potassium chloride or potassium nitrate and supplemental nitrogen such as ammonium nitrate and/or urea.

From our operation of the process using the in-line mixer, which may be of any of the modifications shown below in FIGS. 2, 4, 5, and 6, we have found that the operable and preferred conditions which yield the best results from our processes are as follows: The acid fed to the first reactor should be maintained in the temperature range of about 60° F. to about 360° F. and preferably in the range from about 60° F. to about 300° F. The temperature of the anhydrous ammonia fed to both our first reactor and our in-line reactor should be maintained in the range from about 40° F. to about 400° F. and preferably in the range from about 60 to 360° F. The temperature in the first reactor vessel should be maintained in the range from about 100° F. to about 325° F., and preferably from about 250° to about 300° F., while the reaction temperature maintained in the in-line reactor should be in the range of about 350° F. to about 500° F., and preferably from about 375° to 475° F. Our process can be operated on varying degrees of dirty or clean acid over the broad range wherein the $R_2O_3(Al_2O_3+Fe_2O_3):P_2O_5$ mole ratio is about 0.001 to about 0.1. We have found, however, that our process best operates when this ratio of the feed acid is maintained between about 0.001 and 0.08. The residence time of the reactants in the in-line reactor is, of course, dependent upon the details of construction, but is normally less than one minute, preferably less than 15 seconds, and most preferably is reduced to the shortest time possible. The degree of ammoniation, which may be expressed as pounds of ammonia per unit of $P_2O_5$, wherein one unit of $P_2O_5$ is equal to 20 pounds, is maintained in our first reactor vessel in the range of about 2.5:1 and preferably in the range of about 2:1 whereas the degree of ammoniation in the in-line reactor may vary from 2.5 to about 7, and preferably between about 4 and 6. As has been mentioned earlier, the percent of $P_2O_5$ in the acid fed to our first reactor may range between about 50 and 58 percent if merchant-grade acid is used, although small-scale tests indicate that filter-grade acid may be used in the process containing as little as about 30 percent $P_2O_5$. Alternatively, merchant-grade acid and some filter-grade acid may be proportioned so that the resulting feed acid may range anywhere from about 30 percent $P_2O_5$ to about the maximum of 58 percent $P_2O_5$. This aspect of the invention is not particularly new in that the teachings of Getsinger show similar results. In addition, our process may be operated so that the proportion of $P_2O_5$ which is in polyphosphate form (as percent of total $P_2O_5$) may be maintained in our first reactor vessel at less than about 10 percent and even less than about 3 percent, whereas the proportion thereof maintianed in our in-line reactor may range from 10 to 70 percent or preferably from about 20 to 60 percent.

Referring now more specifically to FIG. 2, there is shown in more specific detail the acid inlet line 6 from scrubber 3 to in-line reactor 7, together with anhydrous ammonia via line 8. As may be seen, the material resulting from the reaction in the in-line reactor is fed via line 7' to our first version of disengager vessel 9 at about its vertical midpoint wherein the heavy viscous foam discharged thereto is to be rapidly and immediately destroyed so as to provide for the disengagement of water vapor entrapped therein, which water vapor is passed as offgas to the atmosphere via line 10. As may be seen, with this arrangement, the material from line 7', which is in the form of heavy viscous foam, is mechanically agitated to destroy the foam, to pass the vapor trapped therein to the atmosphere, and to ensure that the melt resulting therefrom flows to the bottom of disengager vessel 9 and out through the melt outlet via line 12 with a "heel" of melt material maintained to about the load level line thereon indicated.

Figure 3:
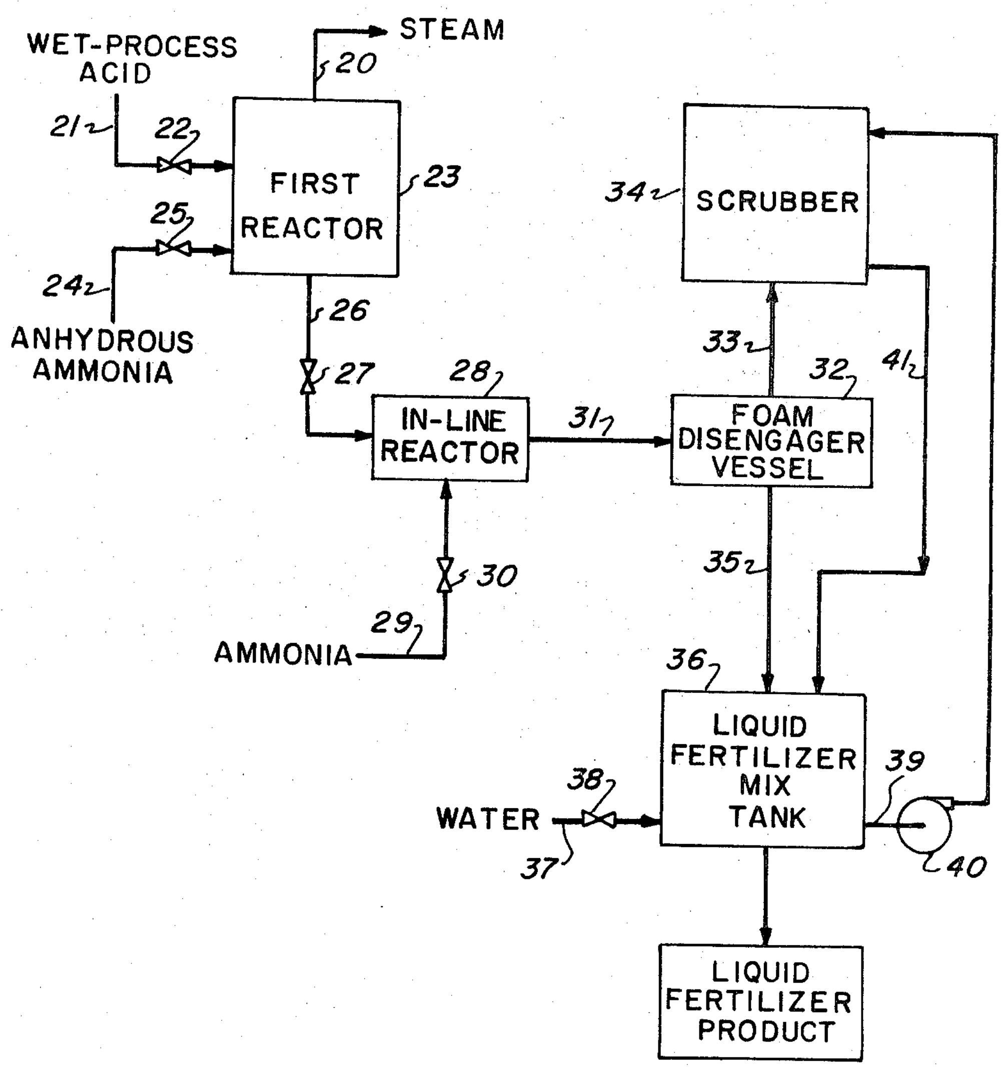
FIG. 3 is a flowsheet generally illustrating the principles of our novel process in another embodiment thereof wherein it is desired to produce directly clear liquid mixed fertilizer solutions by a two-stage ammoniation process employing an in-line reactor as the second stage for direct production of clear liquid ammonium polyphosphate fertilizer solutions.

Referring now specifically to FIG. 3, as has been noted above, the melt produced in FIG. 1 can be used directly as a solid fertilizer or may be stored and shipped to near the point of application and dissolved in water, together with any supplemental material desired, to produce at or near the site of application a liquid fertilizer solution. If on the other hand, it is desired to produce directly in our process a clear liquid fertilizer solution rather than a melt, the flowsheet in FIG. 3 may be followed, which may be thought of as a modification of FIG. 1 wherein ammonia is led into preneutralizer vessel 23 via line 24 and means for control of flow 25 in sufficient quantity to maintain the pH of the solution in the range of about 1.0 to 2.0 when diluted 9:1 with water (10% solution). The steam produced by the heat from the reaction of the ammonia is vented through line 20. A stream of only partially neutralized merchant-grade wet-process phosphoric acid is removed from reactor vessel 23 via line 26 and means for control of flow 27 and introduced into our in-line reactor 28. Simultaneously, anhydrous ammonia from a source not shown is introduced into in-line reactor 28 via line 29 and means for control of flow 30. The fully ammoniated mixture and fixed material flows from in-line reactor 28 to disengager vessel 32 via line 31. From the disengager vessel 32, the off gases are led via line 33 to scrubber 34, and the melt from disengager vessel 32 is fed via line 35 to fluid fertilizer mixing tank 36 while simultaneously adding thereto from a source not shown water from line 37 and means for control of flow 38. The resulting fluid mixed fertilizer in vessel 36 may be pumped through line 39 via pump 40 to scrubber vessel 34 from which it is recycled back to fluid fertilizer mixing tank 36 via line 41.

Figure 4:
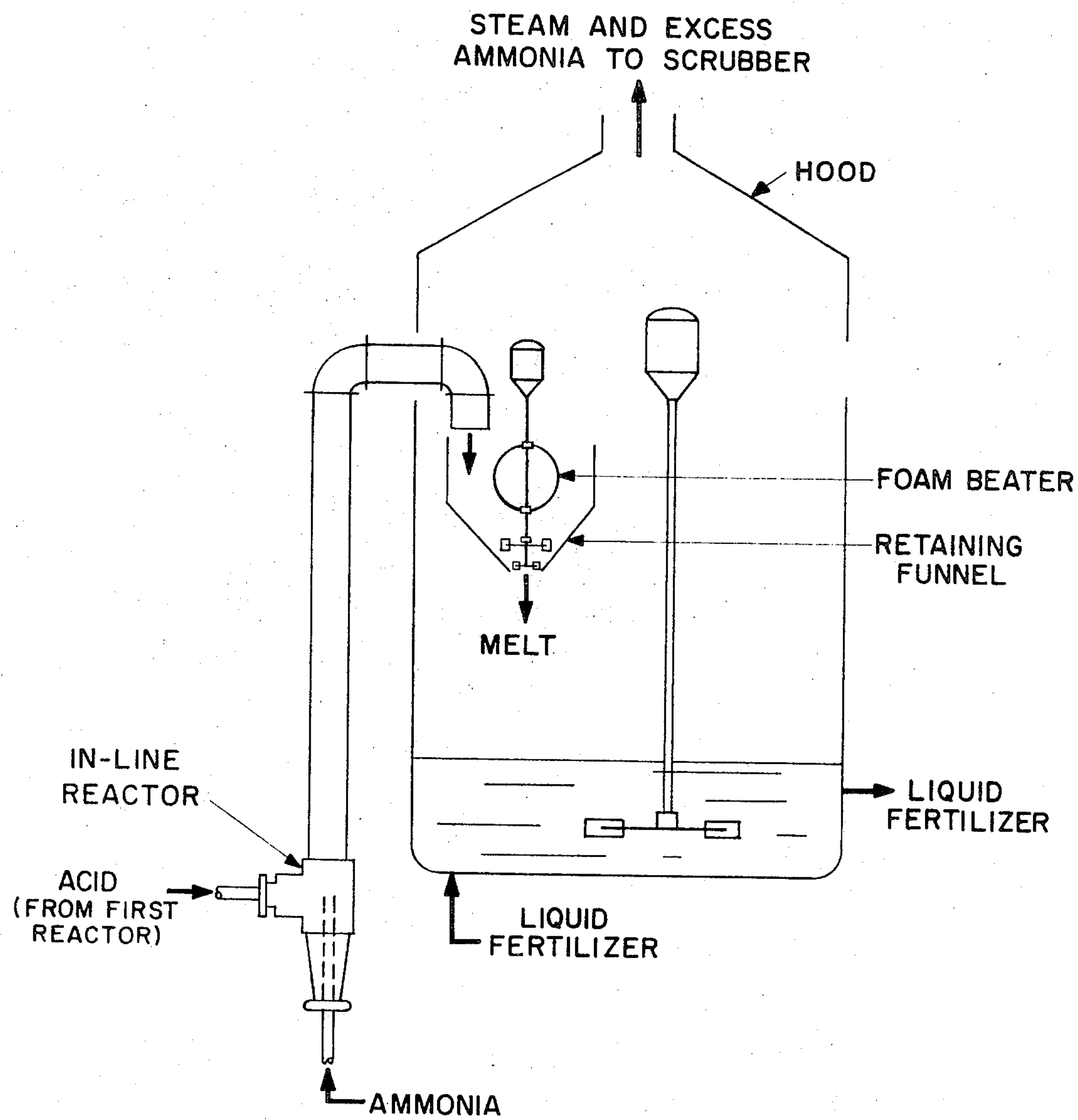
FIG. 4 is an illustration of equipment we use to test our theory and to show that in fact it is necessary to disperse the foam and disengage the water vapor trapped therein before cooling occurs to avoid the hydrolysis reaction between such trapped water vapor and such foam which would deleteriously result in the decreased polyphosphate content of the resulting melt.

Referring now more specifically to FIG. 4, it has been stated that the results of our work show that it is necessary to disperse the foam and separate the water vapor before cooling occurs to avoid the hydrolysis reaction between trapped water vapor and the foam which would result in decreased polyphosphate content of the melt. This requirement was demonstrated in tests utilizing the equipment shown in FIG. 4. In this arrangement, the in-line reactor was discharged into a funnel in such a manner that the material was retained in the funnel for a short period of time while subject to vigorous agitation to disperse the foam. Operation was on a continuous flow basis. Samples were taken on the material discharged from the in-line reactor and also of the material discharged from the funnel. Data from these tests are shown as run 85–1 in Table II below:

TABLE II.—OPERATION OF PILOT PLANT FOR DIRECT PRODUCTION OF AMMONIUM POLYPHOSPHATE FROM WET-PROCESS PHOSPHORIC ACID

| | Run No. | | | |
|---|---|---|---|---|
| | 85–1 [1] | 85–1 [2] | 92–3 [1] | 92–3 [2] |
| Production rate, lb./hr. | 300 | 300 | 300 | 300 |
| Feed acid: | | | | |
| Temp., ° F. | 295 | 295 | 290 | 290 |
| $P_2O_5$, percent | 54.7 | 54.7 | 55.0 | 55.0 |
| $R_2O_3$:$P_2O_5$ mole ratio | 0.06 | 0.06 | 0.06 | 0.06 |
| Ammonia temp., ° F. | 340 | 340 | 330 | 330 |
| 1st stage temp., ° F. | 300 | 300 | 312 | 312 |
| In-line reactor temp., ° F. | 480 | 480 | 480 | 480 |
| Product melt (percent by wt.): | | | | |
| Total N | 11.5 | 11.7 | 11.5 | 11.7 |
| Total $P_2O_5$ | 53.1 | 58.9 | 59.0 | 59.1 |
| Percent of total $P_2O_5$ as: | | | | |
| Available $P_2O_5$ | 100 | 100 | 100 | 100 |
| Polyphosphate $P_2O_5$ | 34 | 47 | 54 | 55 |
| Lb. $NH_3$/unit $P_2O_5$ | 4.8 | 4.8 | 4.8 | 4.8 |

[1] Sample caught at outlet of in-line reactor above funnel.

[2] Sample taken from melt draining out bottom of funnel.

These data show that the material discharged from the in-line reactor was low on polyphosphate while the material discharged from the funnel was high in polyphosphate (34% vs. 47%).

In these tests, each sample was caught in a small cup. The sample from the funnel was in the form of a fluid melt which was poured into a shallow pan and allowed to cool rapidly. The sample from the in-line reactor was in the form of a foam when poured into the shallow pan. It is believed that the sample directly from the in-line reactor is low in polyphosphate because hydrolysis occurs between the entrapped water and the polyphosphate.

Also shown as run 92–3 in Table II are data from a test made in the same equipment in which an acid made from calcined western rock was used. When using an acid made from calcined rock, the foam produced is very light and disperses spontaneously and immediately as it discharges from the in-line reactor. In this test, the polyphosphate content of the material discharged from the in-line reactor was the same as that discharged from the funnel. The results from this test further substantiate the completion of the reaction in the in-line reactor and the problem of foam trapping water vapor.

Thus, it can be seen that our new, novel, and unique process for the production of ammonium polyphosphate from the combination of merchant-grade phosphoric acid and anhydrous ammonia having substantially 100 percent of its $P_2O_5$ in a form readily available to the growing plant and having consistently unusually higher than previously attainable ratios of ammonium polyphosphate to ammonium orthophosphates therein can be obtained in our new, novel, and unique process when the two critical factors of (1) simultaneously ammoniating, dehydrating, and condensing are caused to occur in a single operation such as in our in-line reactor, and (2) water vapor trapped in the resulting heavy viscous foam from (1) supra is rapidly disengaged therefrom before any substantial cooling of the foam occurs, thereby minimizing any changing of the high ratio of ammonium polyphosphate to ammonium orthophosphate through the mechanism of hydrolysis thereof.

In still another embodiment of the present invention we tested and evaluated whether or not our new, novel, and unique direct process for the production of ammonium polyphosphates could be utilized in the production of very high analysis fertilizer suspensions rather than in the production of clear fluid fertilizer solutions as indicated above. In investigating this possibility in one series of tests, we utilized our direct process for the production of ammonium polyphosphate wherein we fed merchant-grade wet-process phosphoric acid and anhydrous ammonia to equipment similar to that shown in FIG. 1, and instead of allowing the melt to solidify from line 12, we discharged same into a mixing tank and added thereto amounts of clay, water, an anhydrous ammonia in an effort to produce a base suspension of about grade 12–40–0. After storage tests of several weeks up to approximately 2 months at room temperature and at temperatures as low as about 32° F., we found that the unusually high grade suspension produced by this further embodiment of our direct process had unusually good keeping qualities in that even under the accelerated conditions of storing for 3 months at 32° F. the suspension volume of the product was essentially 100 percent, i.e., we could detect no settling of the suspension after this relatively long storage time under conditions which have caused other suspensions of lesser grade to precipitate sludge through the mechanism of crystal growth of the original suspended particles. Thus, in this embodiment of our invention, those following our teachings would be able to produce suspension fertilizers from our direct process having a grade as high as 12–40–0, which has unusually excellent storage and handling properties.

Referring now more specifically to FIG. 5, a new and greatly improved apparatus for disengaging water vapor from foam-phase ammonium polyphosphate melt discharged from the in-line reactor has been developed in pilot plant studies of the direct production of ammonium polyphosphate from wet-process acid. The function and purpose of the new vapor disengager are the same as that of the disengaging vessel described in our original application Ser. No. 715,786, filed Mar. 25, 1968, to essentially eliminate the hydrolysis of the polyphosphate to orthophosphate by providing a large surface area and retaining shearing, and dispersing the form-phase melt to allow more water vapor to escape. However, the new unit allows consistent operation with little or no difficulty and greatly improves prospects for use of this process on commercial scale.

A polyphosphate level of about 45 percent or more of the total $P_2O_5$ is required for solubility in liquid fertilizers such as 10–34–0 and 11–37–0 grades derived from ammonium polyphosphate. However, when wet-process acid from uncalcined rock is ammoniated at temperatures high enough (above 450° F.) to convert about 35 percent or more of the $P_2O_5$ to polyphosphate, the resultant melt is thixotropic and becomes extremely viscous in the absence of shear. This behavior probably stems from the presence of organic materials in the acid, since similar high-polyphosphate melts from green acid (made from calcined rock) are always fluid.

The former pilot-plant disengaging vessel, shown in detail in FIG. 2, gave satisfactory results using black acid (made from uncalcined rock) when operated with an 1150-revolution-per-minute foam breaker and an 8-inch-diameter turbine as reported above. The 12-inch-diameter foam breaker required considerable maintenance when operated at 1150 revolutions per minute, and this design would be difficult to adapt to a large commercial plant. For these reasons a new motor and reducer were installed to operate the foam breaker at 430 revolutions per minute. This arrangement eliminated excessive maintenance problems, but the disengager was then unsuitable for the production of high-polyphosphate melt from black acid because of poor shear characteristics and resultant solidification of melt in the bottom of the vessel. Operation for any appreciable period was impossible because the melt would not flow out of the vessel.

The new vapor disengager, shown in FIG. 5, subjects all the melt within it to a high degree of shear, resulting in trouble-free operation at temperatures and polyphosphate contents not possible in the previous disengaging vessel, shown in FIG. 2. The new pilot-plant vapor disengager consists of a stationary 6-inch-diameter tube containing a 5¼-inch-diameter rotor with two helical blades having a pitch of one turn in 8 feet. The entire assembly is insulated to minimize heat losses. It can be operated with the tube axis at any inclination from horizontal to vertical. Inclination close to the horizontal is preferred to provide a large surface area for release of water vapor. The rotor is driven by an air motor. Foam-phase melt from the in-line reactor feeds tangentially into the disengager 6 inches from the end. As noted, the foam phase melt from the in-line reactor is fed tangentially to the disengager. This may be accomplished either perpendicular to the cylindrical axis of the vapor disengager or at any desired angle thereto between about 30 degrees and perpendicular. We have found, however, that we prefer to operate with an angle of about 60° to the cylindrical axis of said vapor disengager.

The rotor blades break the foam and convey the melt, spiraling it around the wall, about 18 inches to the other end where it discharges. Vapor (steam and ammonia) discharges at the feed end to a scrubber where the ammonia is recovered. The vapor can be discharged either by internal pressure (1 or 2 p.s.i.g.) within the disengager or by a slight suction of a few inches of water pulled by a fan or blower.

Pilot-plant test results with the new vapor disengager are shown in Table III below. Data from typical tests using the in-line reactor alone and using the earlier disengager equipped with the 430-revolution-per-minute foam breaker, operating at a low enough T reactor temperature to avoid fluidity problems, are included for comparison.

TABLE III

| Test No. | 191–6th run | 190–2d run | 211–1st run |
|---|---|---|---|
| Product rate, lb./hr. | 500 | 500 | 500 |
| Disengager | None | (1) | (2) |
| Shaft speed, r.p.m. | | 430 | 900 |
| Blade speed, ft./sec. | | 22.5 | 20.6 |
| Feed acid: | | | |
| $R_2O_3$:$P_2O_5$ mole ratio | 0.06 | 0.08 | 0.06 |
| $P_2O_5$, percent | 54.7 | 52.2 | 51.0 |
| Temp., ° F. | 255 | 105 | 292 |
| Temp., ° F.: | | | |
| Ammonia | 305 | 245 | 312 |
| First stage | 284 | 270 | 312 |
| In-line reactor | 472 | 428 | 464 |
| Product melt: | | | |
| N, percent | 11.7 | 12.8 | 12.7 |
| $P_2O_5$, percent | 58.2 | 55.8 | 57.3 |
| Percent of total $P_2O_5$: | | | |
| Available $P_2O_5$ | 100 | 100 | 100 |
| Polyphosphate $P_2O_5$ | 25 | 29 | 49 |

[1] Vessel and foam breaker.
[2] Tube and rotor.

The in-line reactor could not be operated above about 430° F. without fluidity problems using the previous disengaging vessel. At this temperature the product melt contained 29 percent of its $P_2O_5$ as polyphosphate. At in-line reactor temperatures of 464° to 472° F., the melt contained only 25 percent polyphosphate as discharged from the in-line reactor with no disengager in test 191–6, but contained 49 percent when the new vapor disengager was used (axis horizontal) in test 211–1. At 900 revolutions per minute the blade speed of the 5¼-inch-diameter rotor was 21 feet per second, about the same as the 12-inch-diameter foam breaker at 430 revolutions per minute. The tip speed of the original 1150-revolution-per-minute foam breaker was 60 feet per second.

The advantages of the new vapor disengager can be summarized as follows:

(1) The thorough shearing of the melt eliminates the foaming and fluidity problems heretofore encountered when making high-polyphosphate (35% or more) melt from black acid.

(2) The lower tip speed of the rotor facilitates scaleup to a large unit and decreases maintenance requirements. The simpler new unit has operated dependably for extended periods with very little attention, and discharge of melt from it has been essentially trouble-free.

(3) When operated horizontally the entire internal surface area of the tube is used for dehydration instead of only the cross-sectional area, thus decreasing the size of the unit.

(4) Less power is required than in the original unit.

(5) The retention time in the disengager can be easily and continuously varied simply by rotating the tube about its axis to elevate the melt outlet.

After sifting and winnowing through the data and results and operations of our new, novel, improved, and unique process for the simultaneous ammoniation, dehydration, condensation of ammoniated merchant-grade wet-process phosphoric acid from which entrapped water vapor is rapidly and thoroughly disengaged thereby eliminating a separate concentration step for producing highly desirable ammonium polyphosphates having substantially 100 percent available $P_2O_5$ and heretofore consistently unattainable ratios of ammonium polyphosphate to ammonium orthophosphate, we now present acceptable and preferred ranges of operating the variables of our process in Table IV below.

TABLE IV

| Reaction variables | Scrubber first stage | In-line reactor |
|---|---|---|
| $P_2O_5$ content of acid,[1] percent by wt.: | | |
| Limits | 30-58 | |
| Preferred | 52-56 | |
| Acid temperature,[1] ° F.: | | |
| Limits | 60-360 | |
| Preferred | 60-300 | |
| $R_2O_3$:$P_2O_5$ mole ratio of acid: | | |
| Limits | 0.001-0.10 | |
| Preferred | 0.001-0.08 | |
| Ammonia temperature, ° F.: | | |
| Limits | 40-400 | 40-400. |
| Preferred | 60-360 | 60-360. |
| Reaction temperature, ° F.: | | |
| Limits | 100-325 | 350-500. |
| Preferred | 250-300 | 375-475. |
| Retention time, min.: | | |
| Limits | 1-180 | Nil [2]-1. |
| Preferred | 5-25 | Nil [2]-0.25. |
| Degree of ammoniation, lb. $NH_3$/unit of $P_2O_5$: | | |
| Limits | 0.1-2.5 | 2.5-7.0. |
| Preferred | 1.0-2.4 | 4.0-6.0. |
| Polyphosphate $P_2O_5$, percent of total $P_2O_5$: | | |
| Limits | 0-10 | 10-70. |
| Preferred | 0-3 | 20-60. |

[1] The acid concentration and temperature are dependent and inversely related to one another. With acid concentrations less than 52 percent $P_2O_5$, it is usually necessary to super-heat the acid to a temperature above the boiling point (about 260° F.).

[2] Time to start to measure.

Referring now more specifically to FIG. 6, in our later work utilizing the rotary disengager vessel, we found that recovery of the excess ammonia released from the polyphosphate melt in the vessel was difficult when using a conventional vertical tank-type scrubber-reactor for the first-stage reactor. The rotary disengaging vessel is normally operated in a nearly horizontal position and the amount of melt retained in the vessel is sufficient to provide only a very minimum vapor seal. Because of the slight vapor seal provided, the vapors from the disengaging vessel cannot be injected into the first-stage reactor-scrubber at a sufficient depth below the level of partially neutralized acid contained in the first stage to obtain complete reaction between the ammonia in the vapors and the acid contained in the first stage. If the point of injection in the recator-scrubber is at a sufficient depth below the liquid level to get complete reaction, the ammonia and steam released from the melt in the disengaging vessel exit from the vessel through the melt discharge opening rather than hrough the duct provided for conveying of the vapors to the reactor-scrubber. To overcome this problem, the conventional tank-type reactor-scrubber was replaced with a spray reactor-scrubber equipped to operate under a negative pressure induced by an exhaust fan. With this modification the negative pressure induced in the reactor-scrubber by the exhaust fan is transmitted directly to the disengaging vessel because at no point in the system is there a liquid seal, such as there is in a vertical vessel, to isolate the negative pressure from the disengaging vessel. In this type reactor-scrubber the feed acid is introduced through a hollow-cone type nozzle positioned directly above the point of inlet of the vapors from the disengaging vessel. The feed acid reacts with the ammonia from the disengaging vessel and collects in a small sump at the bottom of the scrubber-reactor. The partially neutralized acid is pumped from the sump and a portion of the partially neutralized acid is fed to the second-stage mixing T and the remainder is returned to the reactor-scrubber through three hollow-cone nozzles positioned in series above the nozzle through which the feed acid enters the reactor-scrubber. The purpose of the sump at the bottom of the reactor-scrubber is to provide a small surge capacity to compensate for any variations in liquid flow rates. The purpose of the circulating stream to the reactor-scrubber is to provide a secondary scrubbing liquor to recover any ammonia not reacted with the feed acid and also to provide a method of agitating the liquor in the reactor-scrubber sump. The entire reaction systems is operated under conditions so as to maintain the pH of the partially neutralized acid in the first-stage reactor-scrubber at about 1.8. At this pH the degree of ammoniation of the acid is approaching the point at which the solubility of the ammonium phosphates formed decreases rapidly with an increase in pH, and it is essential that at no point in the system the pH of the partially neutralized acid exceeds this value as will occur because of surges in the liquid and vapor flows. The agitation obtained by the recirculating flow is sufficient to maintain the degree of ammoniation of the partially neutralized acid essentially uniform throughout the entire system.

In this system the heat obtained in the reactor-scrubber from the reaction between the phosphoric acid and from the excess sensible heat contained in the steam from the disengaging vessel is sufficient to maintain the entire first-stage reaction-scrubbing system at a temperature range in which condensation of water does not occur. In addition, all items of equipment are well insulated to minimize heat losses. All of the steam entering the system from the disengaging vessel and all of the steam generated in the first-stage reaction-scrubbing system are exhausted through the vapor outlet of the first-stage reactor-scrubber.

With this equipment modification the vapors from the disengaging vessel can be returned to the reactor-scrubber with no problem. However, the most noticeable and unexpected result of the new equipment arrangement was the complete elimination of foam from the melt discharged from the disengaging vessel. With the entire system under a slight negative pressure, a slight draft is induced through the system with air entering at the melt discharge outlet of the disengage and exiting at the vapor outlet of the reactor-scrubber. This draft serves as a carrier for the steam and ammonia released from the melt so that they are removed from the system at the same rate at which they are released, and so permitting complete dispersal of the foam. A vacuum equivalent to 1 inch of water as measured at the reactor-scrubber outlet was found to be adequate to allow introduction of the vapors from the disengaging vessel into the reactor-scrubber and also provides sufficient airflow through the system to completely defoam the melt.

The measure of specific gravity of the melt obtained when using a slight air flow through the disengaging unit was in the range from about 1.6 to about 1.7, and usually at about 1.65, as compared with only about 0.35 with no air flow through the unit. Density of the solidified melt is 1.76. These data indicate essentially complete defoaming of the melt when using the flow of air through the unit.

Assuming the melt to be defoamed through the length of the disengaging vessel, the calculated retention time of the reaction product from the point of contact of reactants in the T reactor to the point of quenching at the discharge of the disengaging unit either in a circulating stream of fluid fertilizer or in a bed of solid material in a pug mill is 21 seconds, which is well within the maximum permissible time of 120 seconds to avoid the formation of citrate-insoluble phosphatic compounds.

While the degree of foam reduction obtained with the horizontal rotary disengaging unit with no air flow through the unit is acceptable and allows dispersal of the free water entrapped in the foam prior to reduction in temperature and thereby preventing hydrolysis of the polyphosphate with the entrapped water, the melt discharged from the vessel retains some foam appearance. As a result this melt was more viscous and difficult to handle and process than the melt produced when using the air flow through the system. The completely defoamed melt has the fluidity and density required for converting directly to a solid product by a prilling process.

In order that those skilled in the art may better understand how the present invention can be practiced, the following examples are given by way of illustration but not by way of limitation.

EXAMPLE I

The equipment arrangement used in carrying out this test was that shown in FIG. 1 and specifically with the upright tank-type disengager vessel shown in FIG. 2. Wet-process phosphoric acid made from uncalcined phosphate rock and containing 52.3 percent $P_2O_5$ by weight and preheated to 300° F. was fed at the rate of 567 pounds per hour to the first-stage reactor. Gaseous anhydrous ammonia preheated to 310° F. was fed to the in-line mixer. Partially neutralized acid was pumped from the first-stage reactor to the in-line mixer where reaction between the partially neutralized acid and feed ammonia occurred to form molten ammonium polyphosphate. The foamy viscous melt thus produced at a temperature of 445° F. discharged from the in-line mixer to the upright tank-type disengager vessel shown in FIG. 2 at a point about midway between the top and bottom of the vessel. Rotational speed of the foam breaker in this test was 1150 r.p.m. The ammonia and steam separated from the melt by the action of this vessel was fed directly to the first-stage reactor at a point near the bottom of the vessel. The phosphoric acid fed to this vessel as previously mentioned reacted with the ammonia entering from the disengager vessel. The temperature of the partially neutralized acid in the first stage reactor was 300° F. which was more than adequate to prevent condensation of the steam entering this vessel from the disengager vessel and permit release from the partially neutralized acid of all steam entering from the disengager vessel and steam generated in the first-stage reactor by the reaction of the phosphoric acid with the ammonia. The melt fed to the disengager vessel was retained in this vessel for a period of about 2 minutes to effect disengagement of the ammonia and steam from the melt. The melt discharged from the disengager at a rate of 500 pounds per hour was quite viscous and retained a moderate foam appearance. The melt thus produced contained 12.7 percent N and 59.4 percent $P_2O_5$. All of the $P_2O_5$ was citrate soluble and 46 percent of the $P_2O_5$ was in a polyphosphate form.

EXAMPLE II

The equipment arrangement and disengager vessel used to carry out this test was the same as that used in Example I except the rotational speed of the foam breaker in the upright tank-type disengager vessel was reduced from 1150 r.p.m. to 430 r.p.m. because, as previously stated, power and maintenance requirements were excessive at the higher speed. Operational procedure was that used in Example I except that it was necessary to use wet-process phosphoric acid made from calcined phosphate rock instead of that made from uncalcined rock because of the incapability of the slower speed foam breaker to shear the melt to such an extent that the viscosity of the foamy melt was reduced to a point that it would flow from the disengager vessel. In this test the phosphoric acid made from calcined phosphate rock containing 54.4 percent $P_2O_5$ was preheated to 273° F. and was fed to the first-stage reactor at a rate of 560 pounds per hour. Anhydrous gaseous ammonia preheated to 285° F. was fed to the in-line mixer at a rate of 70 pounds per hour. The ammonium polyphosphate melt was produced in the in-line mixer at a temperature of 450° F. The melt discharged from the disengager vessel was quite fluid and foam free, partially due to the shearing action of the foam breaker, but more so as a result of the use of feed acid made from calcined phosphate rock. The melt produced at a rate of 500 pounds per hour contained 11.5 percent N and 60.9 percent $P_2O_5$ with all of the $P_2O_5$ in a water soluble form and 49 percent in polyphosphate form.

EXAMPLE III

The equipment arrangement used in carrying out this test was essentially that shown in FIG. 6 using the earlier mentioned horizontal tube and rotor type disengager vessel shown in FIG. 5 and a spray scrubbing tower for the first-stage reactor with the disengager vessel operating at essentially atmospheric pressure. A single variation in this example from the arrangement shown was no direct connection between the disengager vessel and the scrubbing tower. Rather the vapors from the disengager vessel were collected in an open hood positioned over the vapor outlet of the disengager. The hood was connected to the scrubbing tower and the tower operated under a slight negative pressure so that the vapors from the disengager were carried into the scrubber. This equipment arrangement was for the primary purpose to allow observation of the hydraulic action within the disengager vessel through the opening in the vapor discharge end of the vessel provided for this purpose. With the absence of a direct connection between the disengager vessel and the scrubbing tower the negative pressure in the scrubbing tower was not transferred to the disengaging vessel. Wet-process phosphoric acid made from uncalcined phosphate rock and preheated to 282° F. was fed to the spray tower at a rate of 551 pounds per hour through the bottommost spray nozzle. Anhydrous gaseous ammonia at a temperature of 307° F. was fed to the in-line mixer at a rate of 76 pounds per hour. Partially neutralized phosphoric acid was pumped from the scrubbing tower and recirculated to the tower through the upper three nozzles. A portion of the circulating stream was diverted through a flow meter to the in-line mixer where reaction between the partially neutralized acid and feed ammonia occurred to form molten ammonium polyphosphate. The foamy viscous melt thus produced at a temperature of 452° F. discharged to the horizontal tube and rotor type disengager vessel shown in FIG. 5. Rotational speed of the spiral blade was about 900 r.p.m. The ammonia and steam separated from the melt by the action of this vessel was vented from the vessel and collected in a hood and these vapors then entered the scrubbing tower where the ammonia reacted with the feed acid. The melt discharged from the disengager vessel continuously without difficulty at a rate of 500 pounds per hour was quite fluid and free flowing. The melt contained 12.5 percent N and 58.4 percent $P_2O_5$ all of which was in a citrate soluble form and 42 percent as polyphosphate.

EXAMPLE IV

The procedure and equipment arrangement used in carrying out this test was identical to that used in Example III except the spray scrubbing tower was connected directly to the disengager via a 4 inch duct. With this arrangement the disengager vessel was under the same negative pressure of about 1 inch of water as measured at the scrubber outlet as was the scrubbing tower. This negative pressure induced a small air flow through the disengager into the scrubber which exited the scrubber with the steam generated in the process. In this example wet-process phosphoric acid made from uncalcined rock and containing 51.8 percent $P_2O_5$ was preheated to 290° F. and fed to the spray scrubber through the bottom spray nozzle at a rate of 566 pounds per hour. Anhydrous gaseous ammonia preheated to 305° F. was fed to the in-line mixer at a rate of 69 pounds per hour. The ammonium polyphosphate melt produced in the in-line mixer at a temperature of 465° F. as in Example III flowed directly to the horizontal disengager vessel. The polyphosphate thus formed and disengaged flowed from the disengager continuously as a fluid melt with all foam characteristics completely eliminated. The completely defoamed melt produced in the example had a specific gravity of 1.65 as compared to 0.35 of that made in Example III. The specific gravity of the solidified melt was 1.76. The ammonium polyphosphate melt thus produced at a rate of 500 pounds per hour contained 11.3 percent N and 58.6 percent $P_2O_5$. All of the $P_2O_5$ was citrate soluble and 48 percent of the $P_2O_5$ was in a polyphosphate form.

EXAMPLE V

With the specific equipment and arrangement described in Example IV, a negative pressure of one inch of water as measured at the scrubber outlet was found to be adequate to provide the air flow through the disengager to completely defoam the melt. The negative pressure used in the system is not limited to 1 inch of water, but can be increased beyond this value with no problems encountered in the capability of the disengager to completely disengage the steam and ammonia from the ammonium polyphosphate melt.

A number of tests were run following basically the procedure outlined in Example IV, supra, except that the negative pressure was varied throughout the range of from between about 1 inch and about 10 inches of water. Satisfactory results were obtained throughout this range as far as the foam disengager was concerned. As we increased the negative pressure over about 5 or 6 inches of water and approached about 10 inches of water, there was some evidence of a tendency to flood the spray scrubber tower. Although we might be able to operate the process with greater than about 10 inches of water negative pressure we prefer to operate at near the lower range of about 1 inch of water, thereby reducing the quantity of air introduced into the system to avoid overloading the spray scrubber tower. Also maintaining the negative pressure near the lower end of the range requires less power input to the system. We believe that the process might be operable at less than about 1 inch negative pressure, if the geometry and sizing of the equipment, particularly the sizing of the piping, were changed. We found, however, that with our particular pilot plant, about 1 inch of water negative pressure was the least we could operate with the complete dispersal of the foam.

EXAMPLE VI

The requirement for preheat of the phosphoric acid and ammonia fed to the process is entirely dependent on the amount of free and combined water that must be removed from the phosphoric acid to produce the desired level of phosphate in the polyphosphate form in the product. As the concentration of $P_2O_5$ in the phosphoric acid approaches that of filter grade acid the amount of free water in the acid increases and an increasing amount of free water must be removed in the process to arrive at the point where an anhydrous melt will be formed. After all of the free water has been removed from the melt, additional water in the form of combined water must be removed to convert the phosphate from the ortho form to the non-ortho or polyphosphate form. The net result being that either decreasing the concentration of $P_2O_5$ in the feed acid or increasing the desired amount of phosphate in the melt in a polyphosphate form increases the total amount of water to be removed and therefore increases the heat required. If the heat resulting from the reaction between the ammonia and phosphoric acid is not sufficient to remove the amount of water from the feed acid to produce the desired level of polyphosphate in the product melt then heat must be applied to the system by such methods as preheating the feed phosphoric acid and ammonia to obtain the desired level of phosphate in the polyphosphate form in the product melt. It should, however, be stressed that the process as contemplated is completely operable without the addition of any external heat to produce a melt which, upon further processing, produces the desired solid or fluid fertilizers. Our teaching of use of external heat in several of the examples supra is only to still further enhance the process and ensure that the conversion to polyphosphate approaches or exceeds an arbitrary 50 percent level. This 50 percent level is not a requirement of the process and therefore to teach those skilled in the art how to practice our invention, it perhaps should be disregarded along with the requirement of addition of external heat to the system.

For instance, with a feed acid containing about 56 percent $P_2O_5$, a product melt containing about 50 percent of the $P_2O_5$ in the polyphosphate form can be produced without the use of external heat. It should, of course, be realized that if the feed acid contains a greater amount of impurities than normal, a 50 percent polyphosphate melt can be produced without any external heat using a feed acid having a somewhat lower $P_2O_5$ concentration than 56 percent. In the operation of our pilot plant, we often times arbitrarily strive to produce a melt product having about half of its total $P_2O_5$ content in the polyphosphate form and, as may be seen by our first four examples, to ensure this, external heat was used. It should be realised, of course, that the net result of these first four examples or others using similar feed acids without the use of external heat would merely be to yield a product having a lower $P_2O_5$ content in the polyphosphate form. Such products were produced in our pilot plant, tested, and found to be excellent fertilizers. Thus, the 50 percent polyphosphate requirement should be understood to be an arbitrary one and that the only critical requirement would be that there be enough polyphosphate formed in the melt ensure that the fertilizer material ultimately produced therefrom, if desired in a liquid form, contain sufficient polyphosphates to sequester the impurities derived from the wet-process acid, mainly the iron and aluminum values commonly expressed as the oxides thereof. If the ultimate products are not intended to be liquids, but rather suspensions or solids, our arbitrary requirement of 50 percent polyphosphate is even less applicable. This is not to say, however, that the 50 percent value for polyphosphate is without some merit in that the greater the conversion of orthophosphate to polyphosphate in the form of ammonium salts thereof in the melt the greater has been the amount of water driven off, which water was originally associated with the feed acid constituent. The greater the amount of conversion of the orthophosphate to the polyphosphate in the form of ammonium salts thereof, the greater has been polyphosphates more highly condensed than the pyrophosphates, i.e., the longer chain polyphosphates, which longer chain polyphosphates have evidenced greater sequestering properties than the shorter chain polyphosphates. This, of course, realizes a saving in shipping in that a more concentrated product containing less water is handled.

EXAMPLE VII

In another embodiment of the instant invention which is taught and described in greater detail by our coworker, Horace C. Mann, in application Ser. No. 754,465, filed Aug. 21, 1968, for Production of Ammonium Phosphates and assigned to the assignee of the present invention, the emphasis is on producing a polyphosphate melt wherein the conversion to polyphosphate is held most often to a maximum of about 24 percent of the total $P_2O_5$ and in some instances depending on such factors as the impurity content of the feed acid and additives incorporated in the further processing of the melt, to a maximum of approximately 25–30 percent. This emphasis on holding the conversion to polyphosphate to a predetermined maximum is principally directed to an operation wherein the melt is intended specifically to be further processed to granular solid fertilizers. The melt referred to in our other examples oftentimes contain as much as or greater than 50 percent polyphosphate and such melts are excellent materials for further processing to granular solid mixed fertilizers. However, in this embodiment, it has been discovered that the granulation characteristics of the melt can be further greatly enhanced if the polyphosphate content of same is held to the aforementioned maximum. The polyphosphate content of the melt is maintained at the desired level by maintaining the reaction at the temperature in the range necessary to give a specific polyphosphate level. The reaction temperature is controlled in the proper range by adjusting the acid concentration and amount of preheat, if any, added to the feed acid. A most unexpected advantage in producing the solid granular products using this procedure was the high degree of $P_2O_5$ water solubility in the products. When similar products are produced from wet-process phosphoric acid by established processes, such as are used in producing diammonium phosphate, the water solubility of the $P_2O_5$ will be, at the most, 95 percent of the total. In all products produced by this embodiment of the instant invention the water solubility of the $P_2O_5$ was 98 percent of the total or more. A second advantage is the elimination of the need for a drying step in this process as is required in conventional processes. Since the ammonium phosphate fed to the granulator as an anhydrous melt provides the plasticity required to induce granulation, a water solution phase is not required in the granulator. The other raw materials may then be fed to the granulator either in the form of highly concentrated solutions or dry solids since water is not required in the granulation step to provide the plasticity to induce granulation. Elimination of the drying requirement reduces plant investment cost, operating cost, and reduces potential sources for pollution as compared to that for established processes.

In this embodiment tests have been made in which a solid granular 12–57–0 grade was made by granulating the melt with no additives. A 21–42–0 grade or 28–28–0 grade was made by the addition of urea to the granulating unit and a 19–19–19 grade was made by the addition of urea and potassium chloride to the granulator. In all tests, when producing these grades, a pug mill was used for the granulation equipment. This type of equipment was selected to provide the slight working action of the melts required even with a low polyphosphate content to induce rapid crystallization.

When producing a 12–57–0 grade an acid containing only 50.1 percent $P_2O_5$ was preheated to 270° F. The temperature of reaction was 440° F. and a melt containing 12.5 percent N and 57.2 percent $P_2O_5$ with 27 percent of the $P_2O_5$ in a polyphosphate form was produced The melt was converted to a granular product in a pug mill at the rate of 500 pounds per hour using 3.8 pounds of recycle per pound of product.

When producing a 21–42–0 grade an acid containing 50.7 percent $P_2O_5$ was preheated to 115° F. and used to produce 750 pounds per hour of melt at 405° F. containing 13.4 percent N and 56.0 percent $P_2O_5$ of which 17 percent was in polyphosphate form. The melt was granulated in a pug mill along with 250 pounds per hour of urea solution at 280° F. containing 99 percent urea. About 3.2 pounds of recycle per pound of product were required to control granulation.

When producing a 28–28–0 grade granular product, the same procedure as for 21–42–0 grade was used except that the proportions of melt and urea solution were 500 pounds per hour each. The pug mill required 3.9 pounds of recycle per pound of granular product.

When producing a 19–19–19 grade granular product, acid containing 51.0 percent $P_2O_5$ was preheated to 245° F. to make 500 pounds per hour of 13.0–56.6–0 grade melt at a reaction temperature of 432° F. containing 33 percent of its $P_2O_5$ as polyphosphate. The melt, along with 480 pounds per hour of solid muriate of potash and 500 pounds per hour of urea solution at a temperature of 280° F. and containing 99 percent urea, was converted to 1480 pounds per hour of granular product in a pug mill using 3.0 pounds of recycle per pound of product.

In all of the mentioned tests the acid concentration was less than 52 percent $P_2O_5$ and it was necessary to add some preheat to the acid to obtain the level of polyphosphate in the melt to provide the plasticity required in the granulator to promote granulation. In other tests using a somewhat more concentrated acid no preheat was required. For example, using a feed acid at ambient temperature and containing 53 percent $P_2O_5$ a melt was produced containing 36 percent of the $P_2O_5$ in a polyphosphate form. When using a feed acid at ambient temperature and containing 52 percent $P_2O_5$ a melt was produced containing 26 percent of the $P_2O_5$ in a polyphosphate form. When using a feed acid at ambient temperature and containing 51.8 percent $P_2O_5$ a melt was produced containing 24 percent of the $P_2O_5$ in polyphosphate form. Thus, it can be seen that a melt of the required polyphosphate content to provide the plasticity for granulation can be produced without the need for preheating the acid if the $P_2O_5$ content is in the range of 52 to 53 percent.

The addition of nitrogen to increase the nitrogen content of the product over and above that contained in the melt is not limited to urea but additional nitrogen may be added by the use of such compounds as ammonium nitrate, ammonium sulfate, and others.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved process for the production of ammonium polyphosphates in a form suitable for the manufacture of high-analysis stable solid and fluid mixed fertilizers, said ammonium polyphosphates derived from the ammoniation of wet-process phosphoric acid containing between about 1 and about 10 weight percent of metallic and other incidential impurities, said impurities comprising principally iron and aluminum and normally causing the formation of precipitates and gelatinous bodies in ammonium phosphates, comprising the steps of introducing commercial grade wet-process phosphoric acid containing in the range from about 30 percent to about 58 percent $P_2O_5$ into a first reactor vessel; simultaneously introducing into said first reactor vessel the offgas from a later-mentioned vapor disengager; said offgas from said vapor disengager comprising vapors of water and unreacted ammonia, and said offgas introduction into said first reactor vessel causing the heating and preneutralization of the wet-process phosphoric acid introduced therein; simultaneously removing a stream of the partially neutralized wet-process phosphoric acid from said first reactor vessel and introducing said stream into a second inline reactor; simultaneously introducing a stream of anhydrous ammonia into said in-line reactor and forming in said in-line reactor a reaction product of ammonium polyphosphates resulting from the reaction of said stream of anhydrous ammonia and said stream of partially neutralized wet-process phosphoric acid; removing a stream of reaction product from said in-line reactor and introducing same into said vapor disengager; continuously agitating the reaction product of ammonium polyphosphate in said vapor disengager and breaking the foam thereby causing the release of water vapor entrapped therein; and withdrawing as product from said vapor disengager a melt of ammonium polyphosphates suitable for the subsequent preparation of solid and fluid mixed fertilizers; the improvement in combination therewith for ensuring that the ammonium polyphosphate product is in a form such that substantially 100 percent of said ammonium polyphosphate is readily available to growing plants, said improvement comprising the additional steps of:

(1) introducing said reaction product from said in-line reactor into said vapor disengager at the inlet orifice thereof, said vapor disengager defining a generally closed cylinder, the axis of which is disposed in a generally horizontal attitude, and said inlet orifice thereof disposed in the side wall of said cylinder juxtaposed one end thereof, said reaction product when introduced into said vapor disengager comprising a foam of molten ammonium polyphosphate and entrapped steam;

(2) subjecting said foam introduced into said vapor disengager to vigorous mechanical agitation, said agitation sufficient to disperse said foam at substantially the temperature at which said foam formed whereby subsequent hydrolysis of said molten ammonium polyphosphate with said entrapped steam is substantially eliminated, and said vigorous mechanical agitation provided by mechanically moving said foam introduced into said vapor disengager at the inlet orifice thereof in a cylindrical helical path on the inside walls of said vapor disengager in a direction along the axis thereof away from said inlet orifice and toward the opposite end wall of said vapor disengager;

(3) discharging the resulting melt of ammonium polyphosphate substantially freed from entrapped steam and water vapor through the outlet orifice of said vapor disengager, said outlet orifice disposed through the cylindrical wall thereof and juxtaposed the end wall of the cylinder comprising the said vapor disengager opposite the end wall to which the inlet orifice is juxtaposed;

(4) maintaining a relatively small negative pressure in said first reactor vessel and said vapor disengager to effect a movement of air into the vapor disengager melt outlet orifice; through said vapor disengager, countercurrent with the movement of the melt phase therein; out through said vapor disengager vapor outlet orifice; and through said first reactor vessel, said movement of air through said vapor disengager countercurrent with said movement of melt therein substantially eliminating existence of foam phase in the ultimate product of the process by removing said steam and unreacted ammonia from physical contact relationship with said ammonium polyphosphate melt at a rate at least equal to that at which said ammonia and steam enter said vapor disengager; and (5) simultaneously withdrawing from said vapor disengager the water vapor released from the melt introduced into said vapor disengager resulting from the vigorous mechanical agitation imparted thereto.

2. The process of claim 1 wherein said relatively small negative pressure is maintained in said first reactor vessel and said vapor disengager by exhaust means juxtaposed said first reactor vessel.

3. The process of claim 1 wherein said relatively small negative pressure is maintained in said first reactor vessel and said vapor disengager by condensation of the steam and the offgas from said first stage reactor vessel.

4. The process of claim 1 wherein said relatively negative pressure is maintained in the range from about 1 inch to about 10 inches of water.

5. The process of claim 1 wherein the specific gravity of the melt discharged through the outlet orifice of said vapor disengager is in the range from about 1.6 to about 1.7.

References Cited

UNITED STATES PATENTS

| | | | |
|---|---|---|---|
| 2,908,652 | 10/1959 | Forrester | 55—178 X |
| 3,125,420 | 3/1964 | Coon et al. | 23—259.1 |
| 3,238,021 | 3/1966 | Webber et al. | 23—259.1 |
| 3,310,370 | 3/1967 | Lutz | 23—107 |
| 3,356,348 | 12/1967 | Paul | 55—178 |
| 3,382,059 | 5/1968 | Getsinger | 71—34 |
| 3,502,441 | 3/1970 | Hudson | 71—37 X |
| 3,503,706 | 3/1970 | Legal | 23—107 |
| 3,539,327 | 11/1970 | Hudson | 71—43 X |
| 3,449,107 | 6/1969 | Chapman et al. | 71—43 X |

REUBEN FRIEDMAN, Primary Examiner

R. BARNES, Assistant Examiner

U.S. Cl. X.R.

23—107; 71—43